United States Patent [19]
Lowther

[11] Patent Number: 5,307,874
[45] Date of Patent: May 3, 1994

[54] METHOD FOR TREATING FORMATIONS WITH GELATIN

[75] Inventor: Frank E. Lowther, Plano, Tex.

[73] Assignee: Atlantic Richfield Company, Los Angeles, Calif.

[21] Appl. No.: 970,195

[22] Filed: Nov. 2, 1992

[51] Int. Cl.$^5$ .......................................... E21B 33/138
[52] U.S. Cl. .................................... 166/288; 166/292
[58] Field of Search ............... 166/288, 292, 294, 295, 166/300, 303

[56] References Cited

U.S. PATENT DOCUMENTS

| | | | |
|---|---|---|---|
| 3,601,195 | 8/1971 | Hearn | 166/288 |
| 3,645,336 | 2/1972 | Young et al. | 166/288 |
| 4,612,991 | 9/1986 | Shaw | 166/273 |
| 4,732,690 | 3/1988 | Shaw | 166/273 X |

Primary Examiner—William P. Neuder
Attorney, Agent, or Firm—Drude Faulconer

[57] ABSTRACT

A method for treating a subterranean formation having zones of varying permeablities to alter the flow profile of the formation wherein a specific gelant (i.e. an aqueous solution of ungelled gelatin) is injected into the more permeable zones and is allowed to gel to form a flow-blocking gel therein.

11 Claims, 1 Drawing Sheet

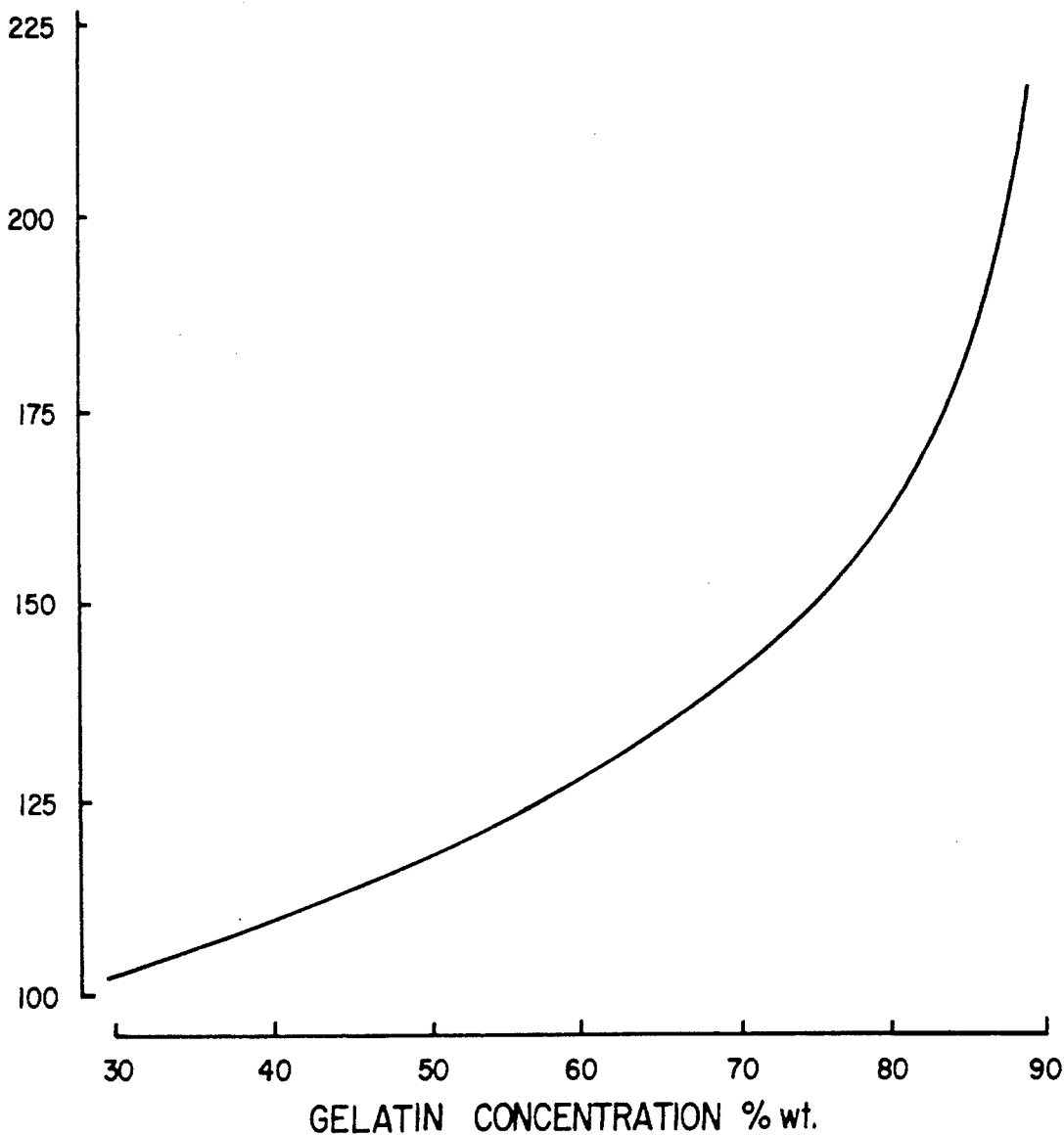

METHOD FOR TREATING FORMATIONS WITH GELATIN

TECHNICAL FIELD

The present invention relates to a method for treating subterranean formations and in one of its aspects relates to a method for treating a subterranean (e.g. hydrocarbon-bearing) formation to alter the flow profile through the formation by injecting a solution of ungelled gelatin into the more permeable zones of the formation and then allowing the gelatin to gel to thereby block or restrict flow through the more permeable zones.

BACKGROUND

Many hydrocarbon-producing reservoirs (e.g. oil and gas) lie in inhomogenous formations which, in turn, are comprised of different zones having varying permeabilities. Before carrying certain completion and/or production operations in such inhomogenious reservoirs, it is often desirable to treat the reservoir to alter the flow profile of fluids therethrough by blocking or restricting flow through the more permeable zones of a formation while encouraging flow through the less permeable zones.

For example, in order to carry out a successful hydraulic fracturing operation in such inhomogenious formations, it may be necessary or at least desirable to first block off the more permeable zones so that the bulk of the fracturing fluid will not merely flow into these zones and be lost. Further, during primary production from such formations, the oil and/or gas normally flows more readily from the higher permeablility zones than it does from the less permeable zones thereby making the oil lying in the less permeable zone difficult to recover with primary recovery operations.

"Secondary recovery" operations are well known for producing oil and/or gas from a formation. Such operations can be used for the initial or "primary" production from a particular reservoir or they can be used in recovering residual oil that may remain in a formation after other production techniques are no longer ecomonical. In a typical secondary recovery operation, a drive fluid (e.g. water and/or gas) is injected into the formation through an injection well to displace the oil towards a production well.

In inhomogenious reservoirs such as described above, the higher-permeable zones or "thief zones", as they are sometimes called, effectively act as pipelines or conduits between the injection and production wells. If the formation is untreated before the drive fluid is injected, it will almost certainly flow through these more-permeable zones thereby effectively bypassing the less permeable zones. This results in early "break-through" of the drive fluid at the production well(s) which, in turn, results in poor sweep efficiency through the formation and low recovery of the residual oil from the less permeable zones.

Several techniques have been proposed for altering or modifying the flow profile of a reservoir in order to direct the bulk of the injected fluid away from the more permeable zones and into the less permeable zones of the reservoir. One such technique involves injecting a "gelant", i.e. aqueous, gel-forming polymer, into the formation through an injection well. The polymer gel solution will normally take the path of least resistance and flow into the more permeable zones of the producing formation. The gelant is then allowed to "set up" to form a flow-blocking gel in the high-permeable zones. Then, when a fracturing fluid or a drive fluid, e.g. water, is injected into the treated formation, it will bypass the high-permeable zones and be diverted into the less-permeable zones. This results in a more efficient fracturing operation or a better recovery of residual oil depending on the operation involved.

Specific examples of gelants, i.e. polymer gels, which have been proposed for treating subterranean formations are set out and discussed in the following references: "Impact of Permeability and Lithology on Gel Performance", R. S. Seright et al, (SPE/DOE 24190); "Gel Placement in Heterogeneous Systems with Crossflow", K. S. Sorbie, (SPE/DOE 24192); and "A New Gelation Technology for In-Depth Placement of $Cr^{+3}$/Polymer Gels in High-Temperature Reservoirs", T. P. Lockhart et al, (SPE/DOE 24194); all of which were presented at the SPE/DOE Eighth Symposium of Enhanced Oil Recovery, Tulsa, Okla., Apr. 22-24, 1992.

While polymer gel treatments such as described above have been tested in the laboratory and have shown promise in the field, the gelants, themselves, (e.g. polyacrylamides) are relatively complex and expensive to use in most applications.

SUMMARY OF THE INVENTION

The present invention provides a method for treating a subterranean formation having zones of varying permeablities to alter the flow profile of the formation wherein a specific gelant (i.e. an aqueous solution of ungelled gelatin) is injected into the more permeable zones and is allowed to gel to form a flow-blocking gel therein.

In carrying out the present invention, an aqueous mixture of ungelled gelatin is first prepared by blending common or technical gelatin (e.g. commercial grade A or B) with a heated liquid, e.g. hot water. "Gelatins" are high molecular weight polypeptides derived from collagen which, in turn, is the primary protein component of animal connective tissue (e.g. bones, skin, hides, tendons, etc.).

The actual composition of the gelatin solution used in a particular treating operation will be dictated primarily by the temperature of the formation to be treated in that the solution will have to remain in its liquid state until it has been injected into the formation in liquid form and then gel upon standing at the formation temperature. The melting point, hence the gel point, of the solution will depend basically on the concentration of the gelatin in the solution. Accordingly, the concentration of gelatin in the solution will be such as to provide a solution with a melting temperature above that of the formation to be treated.

The aqueous gelatin solution is heated to and maintained at a temperature above its melting point as it is injected into the formation through a wellbore. Where the formation temperature is extremely high or where a more firm gel is desired once the gelatin has gelled, a "hardener" (e.g. an aldehyde) may be mixed into the aqueous gelatin solution before it is injected or the hardener may be injected as a slug after the gelatin solution has been place into the formation.

Further, if desired, a displacement fluid (e.g. brine, also heated to a temperature above the formation temperature) can be injected behind the gelatin solution to displace the gelatin solution away from the injection wellbore and further into the formation. The well is then shut-in to allow the gelatin to "cool" to set and form a flow-blocking gel in the more permeable zones of the formation.

Also, the gelation of gelatin is fully reversible, in that gelatin will return to its liquid state upon reheating to above its melting temperature. Accordingly, in some instances, at least a portion of the gelled gelatin can be recovered by circulating a fluid having a temperature above the melting point of the gelatin through the formation, e.g. by a huff-n-puff operation.

BRIEF DESCRIPTION OF THE DRAWINGS

The actual construction, operation, and apparent advantages of the present invention will be better understood by referring to the drawing wherein:

The FIGURE is a graph showing the relationship between the concentration of gelatin in an aqueous gelatin solution and its melting (i.e. gelling) points.

BEST KNOWN MODE FOR CARRYING OUT INVENTION

In accordance with the present inventions, a method is provided for treating a subterranean formation which has a plurality of zones of varying permeablities to alter the flow profile of the formation wherein a specific gelant (i.e. an aqueous solution of ungelled gelatin) is injected into the more permeable zones and is allowed to gel to form a flow-blocking gel therein.

While the present invention will be described below primarily in relation to the treatment of a formation which is to undergo a secondary recovery operation for recovering hydrocarbons, it should be realized that the present invention is also applicable to any operation which is to be carried out in a formation where it is necessary or desirable to block or restrict flow through a more permeable zone of a formation in order to direct or encourage flow through a less permeable zone of the formation. For example, the present invention may also be used to treat a formation (a) before or during certain hydraulic fracturing operations or (b) to isolate or immobilize a gas cap and/or an aquifer from the producing zone of a reservoir to prevent connate water or gas from encroaching into producing wells.

In a typical secondary recovery operation, a drive fluid (e.g. water and/or gas) is injected into the formation through an injection well to displace the formation fluids (e.g. oil) in the formation towards a production well. The injection and production wells may be spaced from each other or may be the same well. The drive fluid normally follows the path of least resistance and flows through the zones of higher permeability while effectively bypassing the less-permeable zones. The terms "high-permeability" and "less-permeable", as used herein, are meant to be relative terms to denote the relative resistance to the flow of fluids therethrough.

In accordance with the present invention, the formation of the type described above is treated by first blocking or restricting flow through the high-permeable zones before the drive fluid in injected so that the drive fluid, when injected, will be directed through the less permeable zones which contain substantial amounts of residual oil. More specifically, this is to be done by first injecting a specific "gelant" (i.e. an aqueous solution of ungelled, common or technical gelatin) into the more permeable zones of the formation.

As is well known, "gelatins" are high molecular weight polypeptides derived from collagen which, in turn, is the primary protein component of animal connective tissue (e.g. bones, skin, hides, tendons, etc.). Gelatin, which is commonly used in foods, glues, photographic and other products, does not exist in nature and is a hydrolysis product obtained by hot water extraction from the collageous raw material after it has been processed with acid, alkaline, or lime. The viscosity of aqueous gelatin solutions increases with increasing concentrations and decreasing description and discussion of gelatin, its compositions and properties, see ENCYCLOPEDIA OF CHEMICAL TECHNOLOGY, Kirk-Othmer, 3rd Edition, Vol. 11, J. Wiley & Sons, N.Y., pps. 711 et sec.

In carrying out the present invention, a particular aqueous mixture of ungelled gelatin is first prepared by blending common or technical gelatin (e.g. commercial grade A or B) with a heated liquid, e.g. hot water. The actual composition of the gelatin solution will be dictated primarily by the temperature of the formation to be treated. That is, the solution will have to be capable of being injected into the formation in liquid form but then be able to gel at the formation temperature. It has been found that the hardness or firmness of the gelatin, once gelled, is primarily dependent on the amount (i.e. concentration) of gelatin in the mixture and is relatively independent on the actual liquid (e.g. water) used to form the gelatin solution.

Referring now to the FIGURE, it can be seen that the melting point, hence the gel point, of the solution is directly related to the concentration of the gelatin in the solution. For example, a typical aqueous gelatin solution used in treating a formation having a temperature of 160° F. would be comprised of approximately more than 80% gelatin and less than 20% water. This particular solution would need to be heated to and maintained at a temperature above its melting point, i.e. above 160°, in order for the solution to remain in a liquid state during injection into the formation but be able to gel after standing at the formation temperature.

In some instances of very high formation temperatures or where a more firm gel is desired once the gelatin has gelled, a "hardener" may be mixed into the aqueous gelatin solution before it is injected or it may be injected as a slug after the gelatin solution has been positioned into the formation. The hardener increases the apparent viscosity of the gelatin and the temperature at which the gelatin will melt. Examples of such hardeners (e.g. aldehydes such as formaldehydes) include those which are used to harden gelatin in photography applications, see THE THEORY OF THE PHOTOGRAPHIC PROCESS, Third Edition, The Macmillan Co., N.Y. Chapter 3, pps. 45–60.

The particular aqueous gelatin solution is formulated as set forth above and is heated to and maintained at a temperature above its melting temperature (i.e. slightly above the temperature of the formation to be treated) while the solution is injected into the formation through an injection well. The flow of the aqueous gelatin solution will flow through the path of least resistance (i.e. more permeable zones) and may continue for so as long as the flow continuity of the formation allows thereby placing the gelatin solution in as large of volume possible within the formation.

If it is desirable to position the gelatin solution into the formation at some distance away from the injection wellbore, a displacement fluid (e.g. brine, also heated to a temperature above the formation temperature) can then be injected through the wellbore to displace the gelatin solution away from the wellbore and further into the formation. The well is then shut in for a period of time sufficient to allow the gelatin to cool to below its melting temperature (i.e. slightly above the formation temperature) to set and form a flow-blocking gel before the drive fluid is injected into the formation.

The drive fluid will now flow through the previously unswept or poorly-swept zones (i.e. less-permeable zones) of the formation. The altered flow profile caused by the now gelled gelatin substantially improves the sweep efficiency of the drive through the formation.

One very important advantage of gelatin, as used in the present invention, is that the gelation of gelatin is fully reversible and will return to its liquid state upon reheating. Accordingly, if the particular treatment of the formation calls for only temporary blocking the more permeable zones, a fluid (e.g. water, steam, or the like) having a temperature greater than the melting temperature of the gelatin can be circulated through the formation to heat and melt the gelled gelatin. The pressure in the wellbore can then be reduced (i.e. huff-n-puff) to allow at least a portion of the gelatin solution to flow from the formation back into the wellbore for recovery to the surface.

What is claimed is:

1. A method for treating a subterranean formation having zones of varying permeabilities to alter the flow profile therethrough, said method comprising:
   injecting an aqueous solution of ungelled gelatin into the more permeable zones of said formation, said aqueous solution having a melting temperature above the temperature of said formation and having a temperature above its melting temperature during injection into the formation; and
   allowing said aqueous gelatin solution to set to form a flow-blocking gel in said more permeable zones of said formation.

2. The method of claim 1 including:
   a hardener added to said aqueous gelatin solution for increasing the temperature at which the solution will melt.

3. The method of claim 2 wherein said hardener comprises:
   an aldehyde.

4. A method for treating a subterranean formation having zones of varying permeabilities to alter the flow profile therethrough, said method comprising:
   preparing an aqueous solution of ungelled gelatin by mixing gelatin and a liquid wherein the concentration of gelatin is sufficient to provide a solution having a melting temperature which is above the temperature of said formation to be treated;
   injecting said aqueous solution of ungelled gelatin through a well into the more permeable zones of aid formation while maintaining the temperature of said aqueous solution above its melting temperature; and
   shutting in said well to allow said aqueous gelatin solution to cool to a temperature below its melting temperature to thereby gel to form a flow-blocking gel in said more permeable zones of said formation.

5. The method of claim 4 including:
   a hardener added to said aqueous gelatin solution for increasing the temperature at which the solution will melt.

6. The method of claim 5 wherein said hardener comprises:
   an aldehyde.

7. The method of claim 4 including;
   injecting a displacement fluid into said formation behind said aqueous gelatin solution to displace said solution away from said well and further into said formation.

8. The method of claim 7 wherein said displacement fluid is heated to a temperature above the melting temperature of said aqueous gelatin solution.

9. The method of claim 4 including:
   circulating a fluid having a temperature above the melting point of the gelled gelatin through the well to melt at least a portion of the gelled gelatin in said formation; and
   recovering at least a portion of said melted gelatin through said well.

10. The method of claim 4 wherein said formation is treated before a secondary recovery operation.

11. The method of claim 4 wherein said formation is treated before a hydraulic fracturing operation.

* * * * *